United States Patent
Dhong et al.

(10) Patent No.: US 7,058,830 B2
(45) Date of Patent: Jun. 6, 2006

(54) POWER SAVING IN A FLOATING POINT UNIT USING A MULTIPLIER AND ALIGNER BYPASS

(75) Inventors: Sang Hoo Dhong, Austin, TX (US);
Silvia Melitta Mueller, St. Ingbert (DE); Hwa-Joon Oh, Austin, TX (US); Kevin Duc Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 10/392,764

(22) Filed: Mar. 19, 2003

(65) Prior Publication Data

US 2004/0186870 A1    Sep. 23, 2004

(51) Int. Cl.
G06F 1/32    (2006.01)

(52) U.S. Cl. .............. 713/320; 713/322; 713/323; 713/324; 713/340; 708/490; 708/495; 708/496; 708/497; 708/501

(58) Field of Classification Search ........... 713/300, 713/320, 322, 324, 323, 340; 708/490, 495–497, 708/501
See application file for complete search history.

(56) References Cited

U.S. PATENT DOCUMENTS

| 5,493,684 | A |   | 2/1996  | Gephardt et al. |
| 5,666,537 | A |   | 9/1997  | Debnath et al. |
| 5,666,539 | A |   | 9/1997  | Kenkel |
| 5,726,921 | A |   | 3/1998  | Krick |
| 5,951,689 | A | * | 9/1999  | Evoy et al. ............... 713/322 |
| 6,035,315 | A | * | 3/2000  | Krick ....................... 708/490 |
| 6,275,838 | B1 | * | 8/2001  | Blomgren et al. ......... 708/501 |
| 6,311,261 | B1 | * | 10/2001 | Chamdani et al. ......... 712/23 |
| 6,388,672 | B1 | * | 5/2002  | Ide et al. .................. 345/544 |
| 6,542,916 | B1 | * | 4/2003  | Hinds et al. .............. 708/501 |
| 6,697,832 | B1 | * | 2/2004  | Kelley et al. ............. 708/501 |
| 6,904,446 | B1 | * | 6/2005  | Dibrino .................... 708/501 |
| 6,922,714 | B1 | * | 7/2005  | Luick ....................... 708/503 |

FOREIGN PATENT DOCUMENTS

JP    03167615 A  *  7/1991

* cited by examiner

*Primary Examiner*—A. Elamin
*Assistant Examiner*—Nitin C. Patel
(74) *Attorney, Agent, or Firm*—Carr LLP; Diana R. Gerhardt

(57) ABSTRACT

The present invention provides for saving power in a floating point unit. Bypass logic is coupled to the input of the aligner and the multiplier. An aligner bypass is coupled to the output of the aligner and an output of the bypass logic. A multiplier bypass is coupled to the output of the multiplier and an output of the bypass logic. The aligner bypass and the multiplier bypass transmit the output of the aligner and multiplier, or the bypass logic, as a function of an aligner bypass signal and a multiplier bypass signal, respectively. An adder is coupled to the output of the aligner bypass and the multiplier bypass. Clock disable logic is used to selectively enable and disable at least portions of the aligner, multiplier and bypass logic. This is done based on the operation and on the value of the operands.

20 Claims, 4 Drawing Sheets

POWER SAVING IN A FLOATING POINT UNIT USING A MULTIPLIER AND ALIGNER BYPASS

TECHNICAL FIELD

The invention relates generally to a floating point unit and, more particularly, to decreasing power consumption in a floating point unit.

BACKGROUND

A floating point unit (FPU) is generally employed as a processor or co-processor for performing calculation intensive manipulations, found in floating point arithmetic, such as addition and multiplication. A first type of FPU has separate units for "multiply" operations and "add" operations. A second type of FPU comprises a single unit which performs both operations. In the FPU, the additive and multiplicative arithmetical operations can be expressed as "A times B plus C," with "A," "B" and "C" as separate inputs.

An FPU, such as the second type of FPU, has a large number of circuits. Two of these circuits are the "multiplier" and the "aligner." Generally, the multiplier inputs two numbers, "A" and "B", to be multiplied, and outputs two other numbers. The two numbers that are outputted, if added together, equal the multiplication of the first two numbers. The "aligner" circuit generally looks at the exponents of all three operands, and then shifts the fraction of the addend accordingly.

In conventional FPUs, the multiplier creates two values "A1" and "B1" from the inputs "A" and "B." In other words, A times B equals A1 plus B1. Furthermore, for addition, the aligner is employed to have the added operand, comprising a mantissa and an exponent, to be expressed as the same order of magnitude as the product A times B. In other words, a C value of $3.04 \times 10^3$ can be expressed as 3040. Therefore, the FPU generates internal values of A1, B1 and C1, wherein C1 is a compatible order of magnitude to A1 and B1. A1, B1 and C1 are input into a 3:2 adder, and two numbers result, D and E. D and E are added together, the result of which equals A times B plus C. This result is then sent to a normalizer and rounder. Furthermore, in many designs, the FPU is also used for the integer multiply operations, not just on floating point data.

However, employing the FPU in this manner can result in significant power demands, in part due to the extensive calculations performed. These power demands can then generate heat. Heat generated by an FPU can place design and use limitations upon the FPU. Therefore, what is needed is an FPU that solves at least some of the power use and heat generation disadvantages of conventional FPUs.

SUMMARY OF THE INVENTION

The present invention provides for saving power in a floating point unit employing operands of a defined value. Bypass logic is coupled to the input of an aligner and a multiplier. An aligner bypass is coupled to the output of the aligner and an output of the bypass logic. A multiplier bypass is coupled to the output of the multiplier and an output of the bypass logic. An adder is coupled to the output of the aligner bypass and the multiplier bypass. In one aspect, clock disable logic is employable to disable the multiplication as a function of the multiplier bypass signal. In another aspect, clock disable logic is employable to disable the aligner as a function of the aligner bypass signal.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, certain details have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as a CPU (central processing unit). The processing unit may also be one of many processing units that share the computational load according to some methodology or algorithm developed for a given computational device. For the remainder of this description, all references to processors shall use the term PU whether the PU is the sole computational element in the device or whether the PU is sharing the computational element with other PUs.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1A:
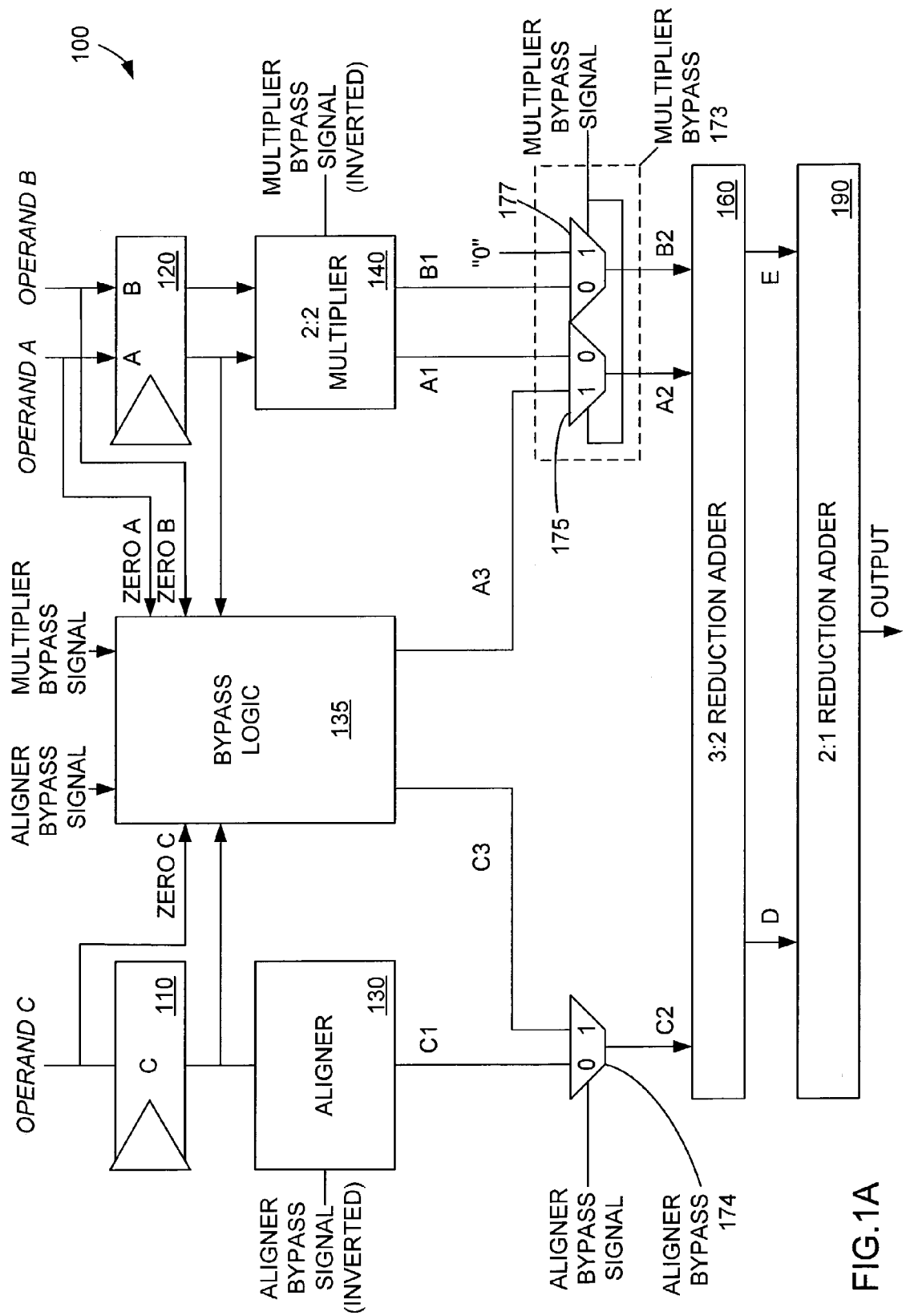
FIG. 1A schematically depicts a portion of an FPU having an aligner circuit, a bypass circuit and a multiplier circuit.

Turning to FIG. 1A, disclosed is a portion of a pipelined FPU 100. Generally, clock disable logic (not shown) is employed by the FPU 100 and dynamically turns on and off stages of an aligner 130 and a multiplier 140. The multiplier 140 can be a multiplier booth reduction tree. For the FPU 100, control logic is employed to parse operation code to determine whether to enable or disable the entire FPU 100 for a given length of time of computer clock cycles. Furthermore, the control logic parses the operation code and the operands in order to determine whether to enable or disable the various stages of the aligner 130 and the multiplier 140.

Employment of the aligner 130 is not necessary if the operands are integers, as the "C" value and the "A" and "B" values have the same alignment. Therefore, the aligner does not shift (align) the "C" value, and can therefore be bypassed. The multiplier 140 is not employed when either the "A" or "B" values are zero ("A times 0 plus C" or "0 times B plus C"). Furthermore, the multiplier 140 is not employed when performing a unity multiplication (that is, an add operation of A times 1 plus C, which equals A plus C). Instead, the "A," "B" or "C" values, as appropriate, are bypassed further into the circuit without being processed by their respective input devices, thereby allowing the aligner 130 or the multiplier 140 to be disabled for an appropriate number of clock cycles. Disabling the aligner 130 or the multiplier 140 in turn saves power. Those of skill in the art understand that the aligner 130 or the multiplier 140 can still output a value if one or more stages of the aligner 130 or the multiplier 140 is disabled. However, the output value corresponding to the stage that is disabled for the clock cycle is not further employed by the FPU 100.

The FPU 100 has three inputs. These are input "A," input "B," and input "C," which correspond to the form "A times B plus C." Inputs A and B are input into latch 120, and input C is input into latch 110. From the latch 120, input values "A" and "B" are input into a 2:2 multiplier 140. The output of the multiplier 140 is expressed as values "A1" and "B1," which are input into the multiplier bypass 173. Input "C" is input into the aligner 130. The output of the aligner 130 is input into an aligner bypass 174.

However, inputs "A" and "C" are also input into a bypass logic 135. In FIG. 1, the output of the bypass logic 135 is input as signal "C3" into the aligner bypass 174, and is also input as signal "A3" into the multiplier bypass 173.

The bypass logic 135 also gets input signals "zero_a," "zero_b" and "zero_c," as illustrated in FIG. 1. These input signals indicate whether any of the floating-point operands of "A," "B" or "C" are zero. Generally, a value of zero for any of these operands indicates that either the aligner 130, the multiplier 140, or both, are not to be employed for that computation, thereby saving power.

Depending on the operation and upon whether the "zero_a", "zero_b" or "zero_c" condition is met, differing A3 or C3 values are transmitted into the aligner bypass 174 or the multiplier bypass 173. The relations between the various inputs are disclosed in the following table. DC stands for the "do not care" state (that is, the output "A3" or "C3" does not matter because the output will not be used by either the aligner bypass 174 or the multiplier bypass 173).

TABLE

| | | Bypass Logic 135 Outputs | | | | |
|---|---|---|---|---|---|---|
| Operation | Zero_C | Zero_A or Zero_B | C3 | A3 | Aligner Bypass Signal | Multiplier Bypass Signal |
| integer | DC | DC | C | DC | 1 | 0 |
| FP add/sub A * 1 + C | Yes | Yes | 0 | 0 | 1 | 1 |
| ~ | Yes | No | 0 | A | 1 | 1 |
| ~ | No | Yes | C | 0 | 1 | 1 |
| ~ | No | No | DC | A | 0 | 1 |
| FP multiply-add A * B + C | Yes | Yes | 0 | 0 | 1 | 1 |
| ~ | Yes | No | 0 | DC | 1 | 0 |
| ~ | No | Yes | C | 0 | 1 | 1 |
| ~ | No | No | DC | DC | 0 | 0 |

In the above table, if an integer operation is employed, in other words, if the "A", "B" and "C" values are integers, the aligner bypass signal is active and the input C value is then forwarded as signal "C3" directly down to the aligner bypass 174. However, the multiplier 140 is enabled by an inverted multiplier bypass signal, and the A3 value from the bypass logic 135 is not employed by the multiplier bypass unit.

In case of a floating point add/sub type "A*1+C", if both the "C" input and the "A" input are zero, then both the "C3" and "A3" values are forced to zero, and both of these values are demultiplexed and employed by the aligner bypass 174 and the multiplier bypass 173, respectively, and transmitted to the 3:2 adder 160. Therefore, both the aligner 130 and the multiplier 140 are disabled for this operation by the aligner bypass signal and the multiplier bypass signal, respectively.

For a floating point add/sub of type "A*1+C", if "C" is zero, but "A" is non-zero, zero is forwarded to and employed by the aligner bypass as value "C3," and the "A3" value from the bypass logic 135 is employed by the multiplier bypass unit 173. The multiplier bypass signal is active; thus, the multiplier is disabled, and the value "A3" is passed to the "A2" input of the 3:2 adder. The "B2" value is forced to zero using the demultiplexor 177. The inputs "C2," "A2" and "B2" of the 3:2 adder 160 then add up to the value "A."

For a floating point add/sub type A*1+C, if "C" is non-zero, but "A" is zero, then the aligner and multiplier bypass signals are both active. The "C" value is passed down to the "C3" input of the aligner bypass 174. The "A3" value is forced to zero and passed to "A2"; "B2" is also forced to zero. The aligner and multiplier are both disabled.

For a floating point add/sub type A*1+C, if both the "C" value and the "A" value are non-zero, then both the multiplier bypass 173 and the aligner bypass 174 employ signals "A1," "B1" and "C1," respectively. In other words, both the aligner 130 and the multiplier 140 are employed and powered for this operation, as a function of the aligner bypass and multiplier bypass signals.

In the case of a floating point multiply-add type A*B+C, the output of the bypass logic depends upon the inputs of A, B and C. If C is zero and the product is zero (that is, A or B is zero or both A and B are zero), the bypass logic 135 forces both outputs C3' and A3 to zero. The aligner and multiplier bypass signals are active; that is, the aligner bypass passes C3 to output C2, the multiplier bypass passes A3 to A2 and forces B2 to zero. The aligner 130 and the multiplier 140 are turned off.

In the case of a floating point multiply-add type A*B+C, if C is zero, and A and B are non-zero, the bypass logic 135 forces output C3 to zero, and the value A3 does not matter. The aligner bypass signal is active; that is, the aligner 130 is turned off and the C3 value passes to C2. The multiplier bypass signal is inactive; that is, the multiplier 140 is active and the multiplier bypass passes A1 and B1 to A2 and B2.

In the case of a floating point multiply-add type A*B+C, if C is non-zero but the product is zero, the bypass logic 135 passes C to output C3 and forces A3 to zero. Both the aligner bypass signal and the multiplier bypass signal are active; that is, the aligner 130 and the multiplier 140 are turned off, C3 is passed to C2, A3 is passed to A2, and B2 is forced to zero.

In the case of a floating point multiply-add type A*B+C, if all three operands are non-zero, the bypass logic 135 is turned off, and the aligner 130 and the multiplier 140 are active. The aligner bypass 174 passes the output C1 to C2, and the multiplier 140 passes the multiplier results A1 and B1 to A2 and B2.

Furthermore, in a further embodiment, the bypass logic 135 itself can be selectively enabled or disabled by the aligner bypass and the multiplier bypass signals. If either of these signals are positive, the bypass control is enabled. Otherwise, the bypass control 135 is disabled.

The aligner bypass 174 comprises a demux. The aligner bypass 174 accepts an aligner bypass signal to determine whether to transmit the C1 value, received from the aligner 130, to the 3:2 adder 160, or whether to transmit the signal C3 to the 3:2 adder 160. When the C3 value in Table 1 is a "DC" value, the aligner bypass signal equals "zero" and the value of C1 is transmitted as signal C2 from the aligner 130 to the adder 160. When the C3 value in Table 1 is not a DC value, the aligner bypass signal equals "one" and the value of C3 is transmitted as signal C2 from the aligner bypass 174 to the adder 160.

The multiplier bypass 173 comprises a demux 175 and a demux 177. The demux 175 receives inputs A3 and A1, and the demux 177 receives input B1 and "0." Demux 175 forwards the A3 value to the adder 160 as signal A2 if A3 is not a DC value, as indicated by the multiplier bypass signal (in other words, if the aligner bypass signal is equal to "one"). Otherwise, the A1 value is forwarded as A2 from the multiplier bypass 173 when the multiplier bypass signal equals zero. In other words, when the A3 value of Table 1 is a "DC," the value of A1 is selected by the multiplier bypass signal to be transmitted as signal A2 to the adder 160.

The demux 177 of the multiplier bypass 173 also employs the multiplier bypass signal. The multiplier bypass signal equals "0," and the demux 177 transmits value B1 as B2 to the 3:2 adder 160 when the A3 value of Table 1 is a "DC."However, if the A3 value of Table 1 is "0," the multiplier bypass signal is a "1" and the value of "0" is instead chosen to be transmitted as signal B2 by the demux 177 to the adder 160. By the transmittal of both of these values, the numbers of "0" are transmitted to the adder 160 for both A2 and B2.

In the case that either "A" or "B" equals a value of floating point "1.0 . . . ", the multiplier bypass signal still enables the transmission of values A1 and B1 as A2 and B2 from the multiplier bypass 173. However, as is understood by those of skill in the art, in an FPU, the sum of the A1 and B1 values generated by the multiplier 140 equals "A times B." Therefore, the multiplier 140 is enabled for this unity multiplication, and no bypass occurs.

In one embodiment, the operand can be detected early enough that the operand "A" or "B" of a floating point multiply add type operation equals "1.0". In that case, the multiplier 140 can be disabled. The operand which is not 1.0 is input to the bypass logic 135 as "A," and passed to the multiplier bypass 173 as "A3." The multiplier bypass signals equals "1".

In a further embodiment, in the case of addition or subtraction (A+C or A−C, for example), the B operand could be evaluated as 1.0. In this case, the multiplier bypass signal is generated and A is used, and B2 is forced to zero using the demultiplexor 177. This can be done by checking the opcode.

The values of the C2, A2 and B2 are transmitted to the adder 160. From the adder 160, values D and E are input into a 2:1 reduction adder 190, such that A2 plus B2 plus C2 equals D plus E. From the adder 190, the output is transmitted.

Generally, employment of the aligner bypass signal, the multiplier bypass signal, and the bypass logic 135 allow for the selective and dynamic disablement of the aligner 130 and the multiplier 140 as a function of the operands to be processed, thereby saving power.

Figure 1B:
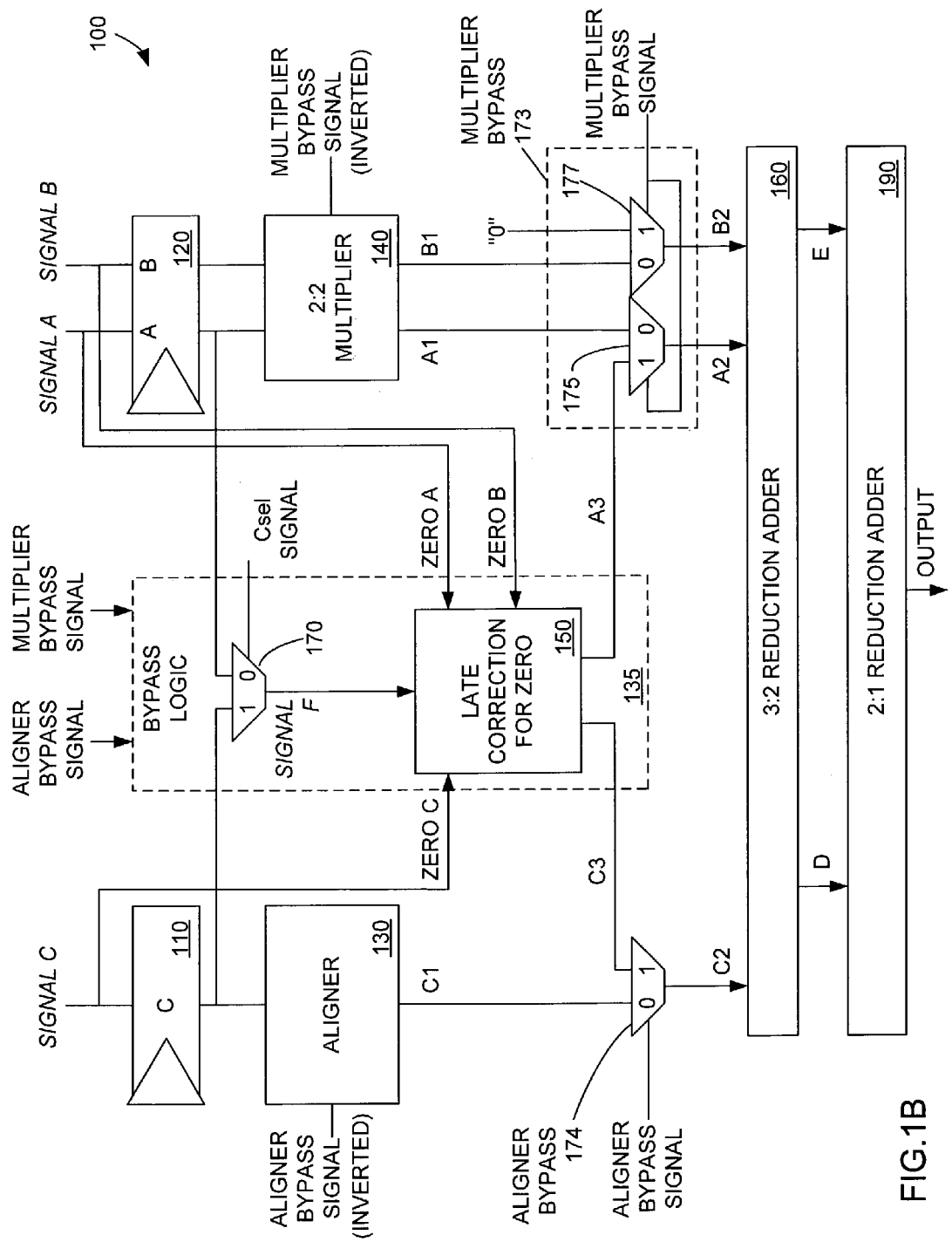
FIG. 1B schematically depicts an FPU, wherein the bypass circuit comprises a MUX and late correction for zero operands.

Turning now to FIG. 1B, disclosed is the portion of the FPU 100, wherein the bypass logic 135 comprises two stages. The first stage is a demultiplexor (demux) 170, the output of which is input, as signal "F", into the late correction for zero logic 150. In some embodiments, the signals zero A, zero B and zero C are not available early enough to control the first stage of bypass logic. Thus, the correction for zero operands must be delayed. The demux 170 selects between the "A" and "C" value based on an aligner Csel, which depends on the type of operation performed. The "A" value is only selected in case of a floating point add/sub operation. The second stage 170 then passes the value "F" to its outputs "C3" and "A3", or forces one or both of its outputs to zero depending on the input signals zero A, zero B and zero C. This covers all the cases listed in Table 1 except for the addition A+C, where A is zero and C is non-zero. For a floating point add/sub type "A*1+C" with zero A operand and non-zero C operand, the aligner bypass is disabled, and the aligner is powered on and aligns the "C" operand, which is then passed as "C1" to the C2 input of the reduction adder 160. The multiplier is disabled, the multiplier bypass is enabled, and the A2 and B2 values are forced to zero, using the bypass logic 135 and the multiplier bypass 173.

Figure 2:
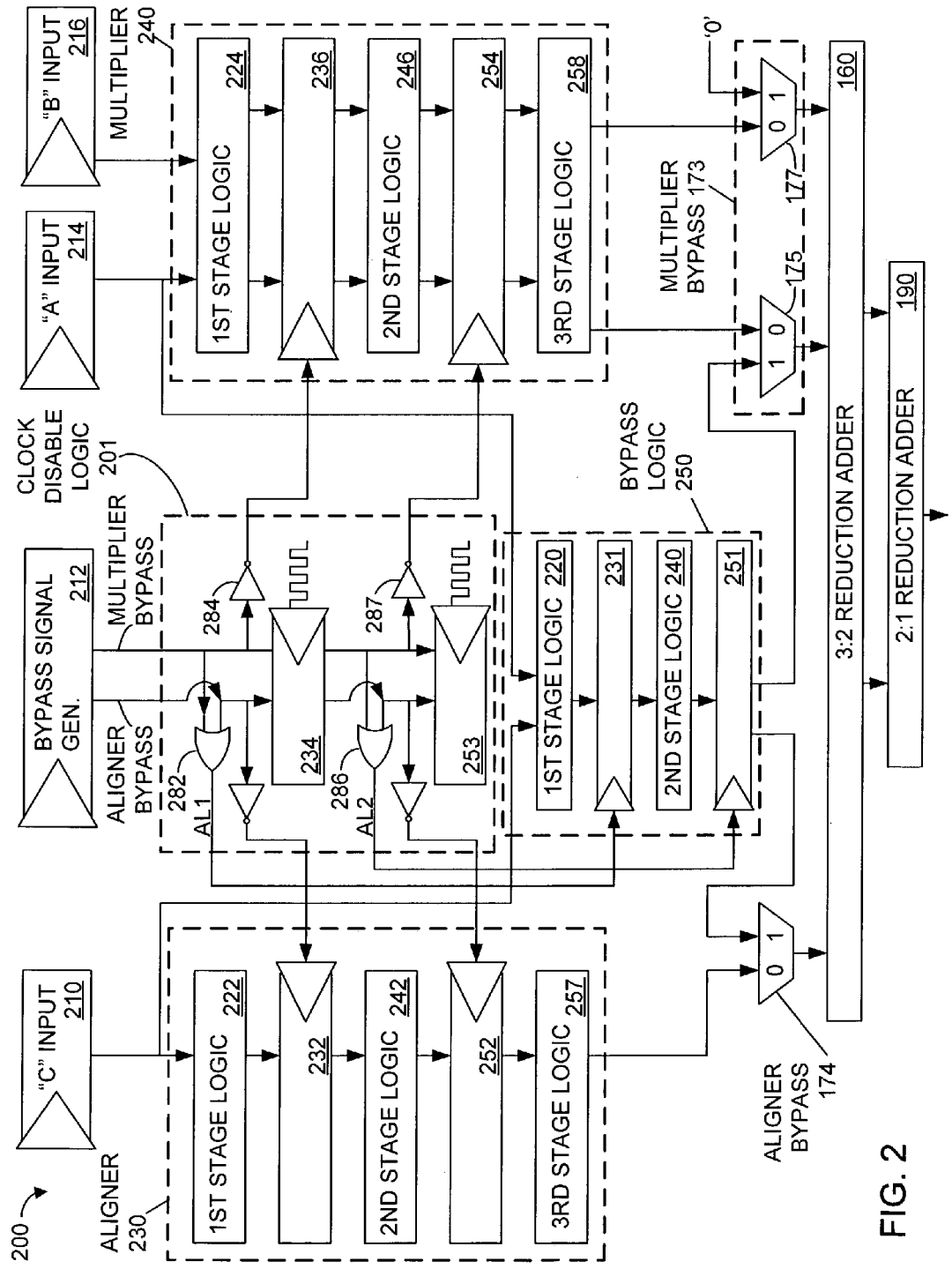
FIG. 2 schematically depicts a portion of an FPU having an aligner circuit, a bypass circuit, clock disable logic, and a multiplier circuit pipelined in 3 stages.

Turning now to FIG. 2, depicted is an FPU having an aligner circuit 230, a bypass logic 250, a clock disable logic 201, and a multiplier circuit 240. Generally, the clock disable logic 201 employs the aligner bypass signal and the multiplier bypass signal to selectively and dynamically enable and disable stages of the aligner 230 and the multiplier 240, thereby saving power. In FIG. 2, both the laches 234 and 253 of the clock disable logic 201 are powered by a clock, and are themselves not disabled (except when the whole FPU is turned off (hardware not shown)), so as to ensure that the appropriate stages of the bypass logic 250, the aligner 230 and the multiplier 240 are dynamically enabled and disabled for the appropriate clock cycles.

In FIG. 2, the bypass logic 250 has a first stage logic 220, a latch 231, a second stage logic 240, and a latch 251. The demux 170 and the corrector 150 are generally distributed between the logic 220 and logic 240.

The aligner bypass and the multiplier bypass signals are input into a bypass signal generator 212. With the next clock cycle, if either the aligner bypass signal or the multiplier bypass signal are a "1" (in other words, either the aligner bypass signal or the multiplier bypass signal are enabled), a signal is sent from the OR gate 282 that enables latch 231, thereby allowing the bypass logic 250 to function for that clock cycle. Because the bypass logic 250 is employed when either the aligner bypass signal or the multiplier bypass signal are equal to "1," the bypass unit is powered on for the requisite number of clock cycles, thereby saving power. Similar enabling/disabling signals are made from the output of latch 254 to the latch 251 for the next cycle. If both the bypass signals are off, latch 231 is disabled, disabling that stage of the bypass logic 250, thereby saving power for that clock cycle.

In FIG. 2, the aligner 230 has a first stage logic 222, a latch 232, a second stage logic 242, a latch 252, and a third stage logic 257. The aligner signal of the clock disable logic 201 is inverted by an inverter and input into the aligner 230 via the latch 232. In other words, if the aligner bypass is "1" (that is, an aligner bypass), this signal is inverted, and is then employed to disable the latch 232. If the aligner bypass signal is "0" (that is, no aligner bypass), the signal is inverted to "1" and the latch 232 is enabled. Similar enabling/disabling signals are made from the latch 253 to the latch 252 for the next clock cycle.

In FIG. 2, the multiplier 240 has a first stage logic 224, a latch 236, a second stage logic 246, a latch 254, and a third stage logic 258. The multiplier bypass signal of the clock disable logic 201 is inverted by an inverter and input into the multiplier 240 via the latch 236. In other words, if the multiplier bypass is "1," this signal is inverted, and then is employed to disable the latch 236. If the multiplier bypass signal is "0" (that is, no bypass), the signal is inverted to "1" and the latch 236 is enabled. Similar enabling/disabling signals are made from the output of latch 234 to the latch 254 for the next clock cycle.

Generally, employment of the aligner bypass signal, the multiplier bypass signal, the clock disable logic 201 and the bypass logic 135 allow for the selective and dynamic disablement of the aligner 130 and the multiplier 140 as a function of the operands to be processed, thereby saving power. Generally, the clock disable logic 201 dynamically enables and disables latches in the aligner 230, the multiplier 240, and the bypass logic 250.

Figure 3:
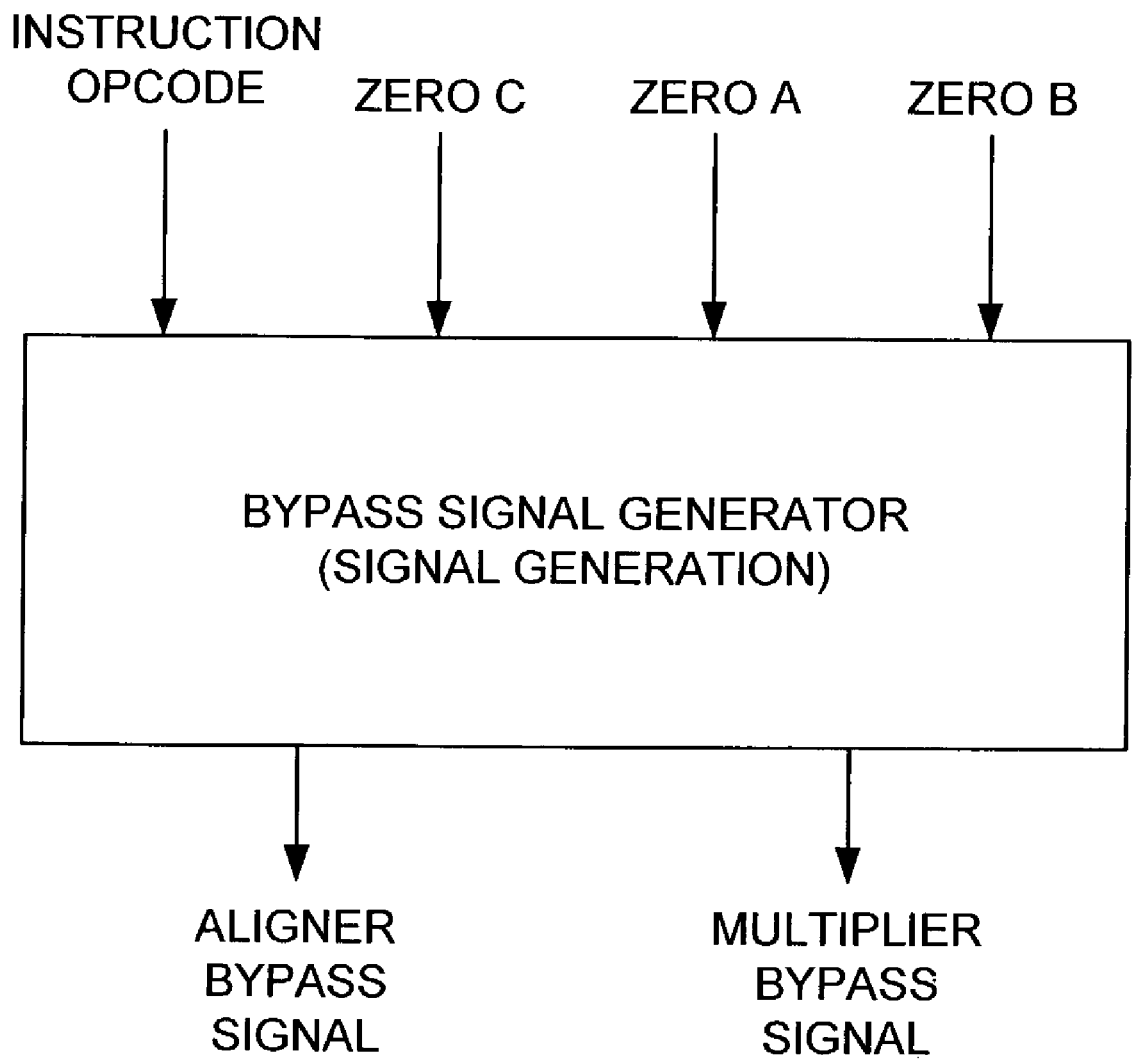
FIG. 3 schematically illustrates the input and output of a bypass controller.

Turning now to FIG. 3, illustrated are the inputs and outputs of a bypass signal generator 212. The bypass signal generator receives opcode and a signal representing whether "A" operand, "B" operand and "C" operand are equal to zero (the "zero_A," "zero_B" and "zero_C" values). These are processed by the bypass signal generator to generate the aligner bypass signal and the multiplier bypass signal.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications (for example, changing the number of pipeline stages) may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A system for saving power in a floating point unit employing a plurality of bypass signals corresponding to operands of a defined value, comprising:
    an aligner;
    a multiplier;
    a bypass logic coupled to an input of the aligner and the multiplier;
    an aligner bypass coupled to the output of the aligner and an output of the bypass logic and a first bypass signal;
    a multiplier bypass coupled to the output of the multiplier and an output of the bypass logic and a second bypass signal; and
    an adder coupled to the output of the aligner bypass and the multiplier bypass.

2. The system of claim 1, wherein the adder comprises a three to two reduction adder.

3. The system of claim 1, wherein the bypass logic further comprises late correction for zero logic.

4. The system of claim 1, further comprising clock disable logic employable to disable the multiplier as a function of a multiplier bypass signal.

5. The system of claim 1, further comprising clock disable logic employable to disable the aligner as a function of an aligner bypass signal.

6. The system of claim 3, further comprising clock disable logic employable to disable the late correction for product zero as a function of both the multiplier bypass logic and the aligner bypass logic.

7. The system of claim 1, wherein the aligner comprises a plurality of latches or pipeline stages which can each be selectively enabled or disabled by clock disable logic.

8. The system of claim 1, wherein the multiplier comprises a plurality of latches or pipeline stages which can each be selectively enabled or disabled by clock disable logic.

9. The system of claim 1, wherein the defined value is a zero value.

10. A method of saving power in a floating point unit of a microprocessor having an aligner with an aligner bypass, a multiplier, and a multiplier bypass, comprising:
    conveying operands to the aligner and the multiplier;
    generating an aligner output and a multiplier output from the aligner and the multiplier;
    transmitting a first signal input into an aligner bypass from a bypass logic;
    generating a second signal input into a multiplier bypass from the bypass logic;
    selecting, by the aligner bypass as a function of an aligner bypass signal, either the output of the aligner or the first signal of the bypass logic; and
    selecting, by the multiplier bypass as a function of a multiplier bypass signal, either the output of the multiplier or the second signal of the bypass logic as a function of a multiplier bypass signal.

11. The method of claim 9, further comprising enabling and disabling at least a portion of the aligner as a function of the aligner bypass signal.

12. The method of claim 9, further comprising employing a late correction for zero operands as an input to the aligner bypass.

13. The method of claim 9, further comprising employing a late correction for zero operands as an input to the multiplier bypass.

14. The method of claim 11 or claim 12, further comprising employing the multiplier bypass signal and the aligner bypass signal to enable and disable at least a portion of a late correction for zero operands logic as a function of both of those signals.

15. The method of claim 9, further comprising employing clock disable logic to selectively enable and disable logic stages of the aligner.

16. The method of claim 9, further comprising employing clock disable logic to selectively disable logic stages of the multiplier.

17. The method of claim 11, further comprising employing clock disable logic to selectively disable logic stages of the bypass logic.

18. The method of claim 11, further comprising conveying a logic value of zero as input to a demultiplexor of the multiplier bypass.

19. A computer program product for saving power in a floating point unit of a microprocessor having an aligner with an aligner bypass, a multiplier, and a multiplier bypass, the computer program product having a computer-readable medium with a computer program embodied thereon, the computer program comprising:

computer code for conveying operands to the aligner and the multiplier;

computer code for generating an aligner output and a multiplier output from the aligner and the multiplier;

computer code for transmitting a first signal input into an aligner bypass from a bypass logic;

computer code for generating a second signal input into a multiplier bypass from the bypass logic;

computer code for selecting, by the aligner bypass as a function of an aligner bypass signal, either the output of the aligner or the first signal of the bypass logic; and computer code for selecting, by the multiplier bypass as a function of a multiplier bypass signal, either the output of the multiplier or the second signal of the bypass logic as a function of a multiplier bypass signal.

20. A processor for saving power in a floating point unit of a microprocessor having an aligner with an aligner bypass, a multiplier, and a multiplier bypass, the processor including a computer program comprising:

computer code for conveying operands to the aligner and the multiplier;

computer code for generating an aligner output and a multiplier output from the aligner and the multiplier;

computer code for transmitting a first signal input into an aligner bypass from a bypass logic;

computer code for generating a second signal input into a multiplier bypass from the bypass logic;

computer code for selecting, by the aligner bypass as a function of an aligner bypass signal, either the output of the aligner or the first signal of the bypass logic; and computer code for selecting, by the multiplier bypass as a function of a multiplier bypass signal, either the output of the multiplier or the second signal of the bypass logic as a function of a multiplier bypass signal.

\* \* \* \* \*